(12) United States Patent
Enevoldsen et al.

(10) Patent No.: US 9,995,270 B2
(45) Date of Patent: Jun. 12, 2018

(54) FLOW DEFLECTION DEVICE OF A WIND TURBINE

(71) Applicant: Siemens Aktiengesellschaft, Munich (DE)

(72) Inventors: Peder Bay Enevoldsen, Vejle (DK); Alejandro Gomez Gonzalez, Aarhus (DK)

(73) Assignee: Siemens Aktiengesellschaft, Munich (DE)

( * ) Notice: Subject to any disclaimer, the term of this patent is extended or adjusted under 35 U.S.C. 154(b) by 428 days.

(21) Appl. No.: 14/684,348

(22) Filed: Apr. 11, 2015

(65) Prior Publication Data
US 2015/0308403 A1 Oct. 29, 2015

(30) Foreign Application Priority Data

Apr. 23, 2014 (EP) .................................... 14165663

(51) Int. Cl.
*F03D 1/06* (2006.01)
*F03D 7/02* (2006.01)

(52) U.S. Cl.
CPC ......... *F03D 1/0633* (2013.01); *F03D 1/0608* (2013.01); *F03D 1/0675* (2013.01); *F03D 7/0252* (2013.01); *F05B 2240/311* (2013.01); *Y02B 10/30* (2013.01); *Y02E 10/721* (2013.01); *Y02E 10/723* (2013.01)

(58) Field of Classification Search
CPC . F03D 7/0252; F03D 1/0683; F05B 2240/311
See application file for complete search history.

(56) References Cited

U.S. PATENT DOCUMENTS

| | | | | |
|---|---|---|---|---|
| 7,419,356 B2 * | 9/2008 | Stiesdal | ................ | F03D 1/0641 416/1 |
| 8,550,777 B2 * | 10/2013 | Kildegaard | ............. | F03D 1/065 416/62 |
| 9,033,661 B2 * | 5/2015 | Pesetsky | ............... | F03D 1/0633 416/23 |
| 9,752,559 B2 * | 9/2017 | Herr | ........................ | F03D 7/022 |
| 2010/0278657 A1 * | 11/2010 | Kildegaard | ............. | F03D 1/065 416/241 R |
| 2011/0042524 A1 | 2/2011 | Pelley | | |
| 2011/0223022 A1 | 9/2011 | Fischetti | | |
| 2013/0209255 A1 * | 8/2013 | Pesetsky | ............... | F03D 1/0633 416/9 |

FOREIGN PATENT DOCUMENTS

| | | |
|---|---|---|
| CA | 2725360 A1 | 6/2011 |
| DE | 102011053893 A | 4/2012 |
| GB | 2227286 A | 7/1990 |
| WO | 2004088130 A1 | 10/2004 |

* cited by examiner

*Primary Examiner* — Justin Seabe
*Assistant Examiner* — Juan G Flores
(74) *Attorney, Agent, or Firm* — Beusse Wolter Sanks & Maire

(57) ABSTRACT

A rotor blade of a wind turbine is provided, wherein the rotor blade has a flow deflection device for influencing an airflow flowing from the leading edge section of the rotor blade to the trailing edge section of the rotor blade. The flow deflection device passively changes its configuration depending on the bending of the rotor blade. Furthermore, the airflow is influenced such that load on the rotor blade is reduced. Furthermore, a method to reduce load on a rotor blade of a wind turbine is provided.

11 Claims, 10 Drawing Sheets

FLOW DEFLECTION DEVICE OF A WIND TURBINE

CROSS REFERENCE TO RELATED APPLICATIONS

This application claims the benefit of European Application No. EP14165663 filed Apr. 23, 2014, incorporated by reference herein in its entirety.

FIELD OF INVENTION

The present invention relates to a rotor blade of a wind turbine comprising a flow deflection device for influencing an airflow flowing across the rotor blade. Furthermore, the invention relates to a method to reduce load on a rotor blade of a wind turbine.

BACKGROUND OF INVENTION

Designing a large rotor blade of a wind turbine is limited by several factors. Regarding long and slender rotor blades, one of the most important design challenges is the clearance between the tip section of the rotor blade and the surface of the tower of the wind turbine during extreme load situations. This is to avoid collision between the rotor blade and the tower as the rotor blade typically features certain flexibility. The problem of maintaining a sufficient rotor blade tower clearance is usually solved from a structural design perspective. In particular, this involves an increase of the stiffness of the rotor blade by increasing the stiffness of the main spar of the rotor blade.

However, this is a purely structural solution which leads to a higher mass of the rotor blade and thus leads to a higher cost of the rotor blade as well as higher fatigue loads in both the rotor blades and the hub components of the wind turbine.

Aerodynamically, the problem of high tip deflections has been solved in the following ways:

1) Increasing the slenderness of the blade. The drawback of this solution is that the aerodynamic performance during normal operation of the wind turbine is also affected and that the structural building height of the wind turbine may be significantly reduced.

2) Reduction of the aerodynamic twist of the rotor blade towards the tip section. The drawback of this solution is the loss of performance during normal operation.

3) Use of active flaps. The drawback of this solution is the need to introduce active elements in the rotor blade. This is, for instance, problematic as the lifetime of a rotor blade may easily exceed 20 or 25 years and that servicing these active elements may be complex and costly.

Thus, it is desirable to provide ways to reduce the deflection of a rotor blade of a wind turbine such that a sufficient clearance between the rotor blade and the tower of the wind turbine is maintained and collision between the rotor blade and the tower is avoided.

SUMMARY OF INVENTION

This objective is achieved by the independent claims. The dependent claims describe advantageous developments and modifications of the invention.

In accordance with aspects of the invention there is provided a rotor blade of a wind turbine, wherein the rotor blade comprises a flow deflection device for influencing an airflow flowing from the leading edge section of the rotor blade to the trailing edge section of the rotor blade. The flow deflection device passively changes its configuration depending on the bending of the rotor blade. The airflow is influenced such that load on the rotor blade is reduced.

In other words, a rotor blade of a wind turbine is subject to bending. This may, for instance, be caused by a wind load acting on the rotor blade. The bending of the rotor blade passively induces a change of the configuration of the flow deflection device. As a consequence, the airflow is influenced such that load on the rotor blade is reduced.

A wind turbine refers to a device that can convert wind energy, i.e. kinetic energy from wind, into mechanical energy, which is subsequently used to generate electricity. A wind turbine is also denoted a wind power plant.

The rotor blade comprises a tip section and a root section.

The tip section is referred to as the portion of the rotor blade which is surrounding the tip of the rotor blade. In particular, the volume of the tip section comprises at the most a portion of 10% of the volume of the whole rotor blade.

Likewise, the root section is referred to as the portion of the rotor blade which is surrounding the root of the rotor blade. In particular, the volume of the root section comprises at the most 10% of the volume of the whole rotor blade.

Furthermore, the rotor blade comprises a leading edge section with a leading edge, as well as a trailing edge section with a trailing edge.

Again, the leading edge section is referred to as the portion of the rotor blade which is surrounding the leading edge. Likewise, the trailing edge section is referred to as the portion of the rotor blade which is surrounding the trailing edge.

Furthermore, chords of the rotor blade are defined as straight lines between the leading edge and the trailing edge at each span-wise position of the rotor blade. The point of the trailing edge where the respective chord has maximum length is denoted as the shoulder of the rotor blade.

The span, which is also denoted as a center line of the rotor blade, extends from the tip section to the root section. If the rotor blade is a straight rotor blade, the span is a straight line. Alternatively, if the rotor blade has a curved, i.e. a swept shape, the span is curved, too, thus following the shape of the rotor blade.

Furthermore, the rotor blade can be divided into a transition section and an airfoil section. The transition section is referred to as the span-wise section of the rotor blade between the root and the shoulder. The airfoil section is referred to as the span-wise section of the rotor blade between the shoulder and the tip section. The transition section is adjacent to the airfoil section.

Finally, a suction side and a pressure side can be attributed to the rotor blade. The suction side is also referred to as the upper surface of the rotor blade, and the pressure side is also referred to as the lower side of the rotor blade.

An important aspect of the present invention is that the rotor blade comprises the flow deflection device which influences the airflow flowing across the rotor blade.

A first group of conventional flow deflection devices maintain their shape, their orientation and their configuration at different operating conditions of the wind turbine. In other words, their appearance and their structure remain unchanged regardless if the wind turbine is in an idle state or if extreme loads, for example due to wind gusts, affect the wind turbine, in particular on the rotor blade.

A second group of conventional flow deflection devices change their shape and/or their orientation and/or their configuration depending on threshold values which are pre-determined and which depend on certain parameters of the wind turbine. It is noted that these parameters do not include e.g. a curvature, i.e. a bending, of the rotor blades. In other words conventional flow deflection devices are activated by some sort of external regulation, i.e. external mechanism.

The inventive flow deflection device changes passively its configuration depending on the bending of the rotor blade. The bending of the rotor blade refers to a curvature of the rotor blade along its longitudinal axis, i.e. along its span extending from the root section to the tip section of the rotor blade.

It is noted that the change of the configuration of the flow deflection device occurs passively. No active external stimulus such as an electric, pneumatic, hydraulic and/or mechanical signal is applied to the flow deflection device in order to induce the change of configuration.

Particularly, the rotor blade may comprise a small curvature in span-wise direction in an unloaded state of the rotor blade. In a loaded state of the rotor blade, which is for instance caused by the force of the wind acting on the rotor blade, the rotor blade is bent, i.e. curved towards the tower of the wind turbine. Depending on the extent of the curvature the flow deflection device changes its configuration. As a consequence of the change of configuration of the flow deflection device, the airflow which is flowing from the leading edge section of the rotor blade to the trailing edge section is influenced, in particular deflected, such that the load on the rotor blade and thus the load on the wind turbine in general, is reduced.

As a consequence, the bending of the rotor blade may be reduced. Thus, a sufficient clearance between the tip section of the rotor blade and the tower is maintained in order to avoid collision between the rotor blade and the tower. Deflection of the airflow may, for instance, be such that the airflow is deflected towards the suction side of the rotor blade. Alternatively, the airflow may also be deflected away from the suction side. An important aspect is that by the deflection of the airflow load of the wind turbine is reduced.

An advantage of the passive activation of the flow deflection device is that no external energy supply for the activation of the flow deflection device is needed.

Another advantage of providing a purely aerodynamic solution for solving the problem of maintaining a sufficient clearance between the rotor blade and the tower is that no significant change in the blade structure and the mass of the rotor blade is needed.

Another advantage of the fact that the flow deflection device is activated by bending of the rotor blade is that it can be designed such that the flow deflection device only affects the direction of the airflow at extreme loads and does not affect or influence the airflow at normal operation of the wind turbine.

A further advantage of the flow deflection device is that it is relatively inexpensive and durable, thus need for maintenance of the flow deflection device is low.

Yet another advantage of the rotor blade with the flow deflection device is that deflection of the tip section of the rotor blade is reduced, thus a more aggressive operation of the rotor blades and the wind turbine as a whole is possible. This leads to an increase of energy production of the wind turbine.

In a first alternative, the change of configuration of the flow deflection device starts at a particular degree of bending of the rotor blade.

This particular degree of bending of the rotor blade may be characterized by a threshold value of bending of the rotor blade. In other words, there exists a first configuration of the flow deflection device for a bending of the rotor blade below the threshold value and a second configuration of the flow deflection device for a bending of the rotor blade exceeding the threshold value.

The flow deflection device may gradually change its configuration for a bending of the rotor blade exceeding the threshold value.

Alternatively, the change of configuration may also be activated by a kind of snap action at the threshold value. In this case, there may be no further change of the configuration of the flow deflection device for increasing bending of the rotor blade exceeding the threshold value.

In a second alternative, the flow deflection device continuously changes its configuration depending on the bending of the rotor blade.

In other words, there is no snap action which is activated at a certain threshold value of the bending of the rotor blade. Thus, instead of having a first configuration of the flow deflection device for a bending of the rotor blade below the threshold value and having a second configuration of the flow deflection device for a bending of the rotor blade exceeding the threshold value, the configuration of the flow deflection device changes continuously with regard or according to the bending of the rotor blade.

An advantage of a continuously changing configuration is that no pre-determined threshold value for activation of the flow deflection device has to be specified but that the flow deflection device is activated in a broad range of bending of the rotor blade.

In another advantageous embodiment, the flow deflection device comprises at least one lid and the lid is flush with a base plate at an unloaded state of the rotor blade. Thus, the airflow is prevented to flow between the lid and the base plate. At a loaded state of the rotor blade, the lid folds outwardly, thus opening up a flow channel for the airflow between the lid and the base plate.

An advantage of such a flow deflection device is its ease of manufacturing and its effectiveness in deflecting the airflow when the flow channel is opened.

In particular, the flow deflection device may comprise a first lid and a second lid. Both lids may have a similar shape and may be arranged opposite to each other. The flow deflection device may be arranged such with regard to the remaining rotor blade that the upper surface of the lid is substantially parallel to the surface of the trailing edge section of the rotor blade.

The loaded state of the rotor blade has to be understood such that bending of the rotor blade occurs. If the rotor blade is bent, a flow channel opens at the flow deflection device. Consequently the airflow flowing from the leading edge section to the trailing edge section is deflected at the flow deflection device. Compared to the loaded state of the rotor blade where the rotor blade is bent, at an unloaded state of the rotor blade this flow channel is closed and the airflow flows above the upper surface of the lid.

In an advantageous embodiment, the flow deflection device is arranged on the pressure side of the rotor blade.

Advantageously, the airflow is deflected such that it is deflected towards the suction side of the rotor blade.

In another advantageous embodiment, the flow deflection device is arranged in the trailing edge section of the rotor blade.

According to this specific design of the rotor blades, an optimum position and extension of the flow deflection device along the trailing edge section may be determined.

Advantageously, the flow deflection device is arranged close to the tip section of the rotor blade. The flow deflection device may for example have a span-wise extension of 10% with regard to the total length of the rotor blade, but may also have a larger extent.

The flow deflection device may comprise a plurality of units which are arranged directly adjacent to each other or may be spaced to each other.

It may also be advantageous to arrange several groups of units together, thus having a plurality of flow deflection devices which are spaced from each other.

In another advantageous embodiment, the flow deflection device comprises a first surface portion and a second surface portion. The first surface portion and/or the second surface portion folds up when bending of the rotor blade is above a pre-determined threshold bending value, thus guiding the airflow away from the surface of the rotor blade.

Although the flow deflection device advantageously changes continuously its configuration, it might be beneficial if a significant folding up of the first surface portion and/or the second surface portion occurs if a pre-determined threshold bending value is exceeded. In other words, a significant impact of the flow deflection device regarding the airflow is achieved if a certain bending of the rotor blade is realized.

If at least one surface portion folds up, a deflection angle can be determined. The deflection angle may be regarded as a measurement of the change of configuration of the flow deflection device.

In an advantageous embodiment, the flow deflection device is arranged on the suction side of the rotor blade.

An advantage of positioning the flow deflection device at the suction side is that stall of the airflow flowing along the suction side can be induced. Under normal operation conditions stall of the airflow is typically undesired at rotor blades of a wind turbine. However, under extreme loading it is beneficial if stall is induced as this might lead to a reduction of the load of the rotor blade and thus reduce bending of the rotor blade.

In another advantageous embodiment, the flow deflection device is arranged upstream with regard to a vortex generator mounted to the surface of the rotor blade.

This is advantageous because in an unloaded state of the rotor blade the vortex generator is active and prevents a premature stall of the airflow. Thus, the lift coefficient is increased and more energy can be extracted from the airflow. However, in extreme loading conditions a further increase of the lift coefficient of the rotor blade is or may have a negative impact.

Thus, it is advantageous if in a loaded state the flow deflection device which is located upstream with regard to the vortex generator is activated and deflects the airflow away from the vortex generator thus leading to a premature stall, thus leading to a reduction of the load of the rotor blade.

In another advantageous embodiment, the flow deflection device is a part of a retrofit kit for a rotor blade of a wind turbine.

Due to the basic design and concept of the flow deflection device the flow deflection device may easily be attached to the rotor blade of an existing and operating wind turbine. Thus, it is well-suited to retrofit the rotor blade and upgrade the wind turbine.

The invention is further directed towards a method to reduce loading on a rotor blade of a wind turbine, wherein an airflow flowing from the leading edge section of the rotor blade to the trailing edge section of the rotor blade is passively influenced by a flow deflection device. The method comprises the steps of—inducing a change of the configuration of the flow deflection device by bending of the rotor blade, and—influencing the airflow such that load on the rotor blade is reduced.

Note that the steps of inducing the change of configuration of the flow deflection device and the influence on the airflow may happen simultaneously. The change of the configuration of the flow deflection device may be regarded as the cause or the reason for deflection of the airflow. A consequence of the deflection of the airflow is the reduction of the loading of the rotor blade.

In an advantageous embodiment, the flow deflection device is retrofitted to the wind turbine.

Thus, the presented method of load reduction of a rotor blade may also be applied to the rotor blade of an existing and operating wind turbine.

In another advantageous embodiment, the flow deflection device continuously changes its configuration depending on the bending of the rotor blade.

It is advantageous if the flow deflection device for example opens up or folds up in a continuous manner instead of, for instance, snapping at a pre-determined threshold value. This allows an increasing impact of the flow deflection device on the airflow according to the extent of the bending of the rotor blade.

BRIEF DESCRIPTION OF THE DRAWINGS

Embodiments of the invention are now described, by way of example only, with reference to the accompanying drawings, of which.

DETAILED DESCRIPTION OF INVENTION

Figure 1:
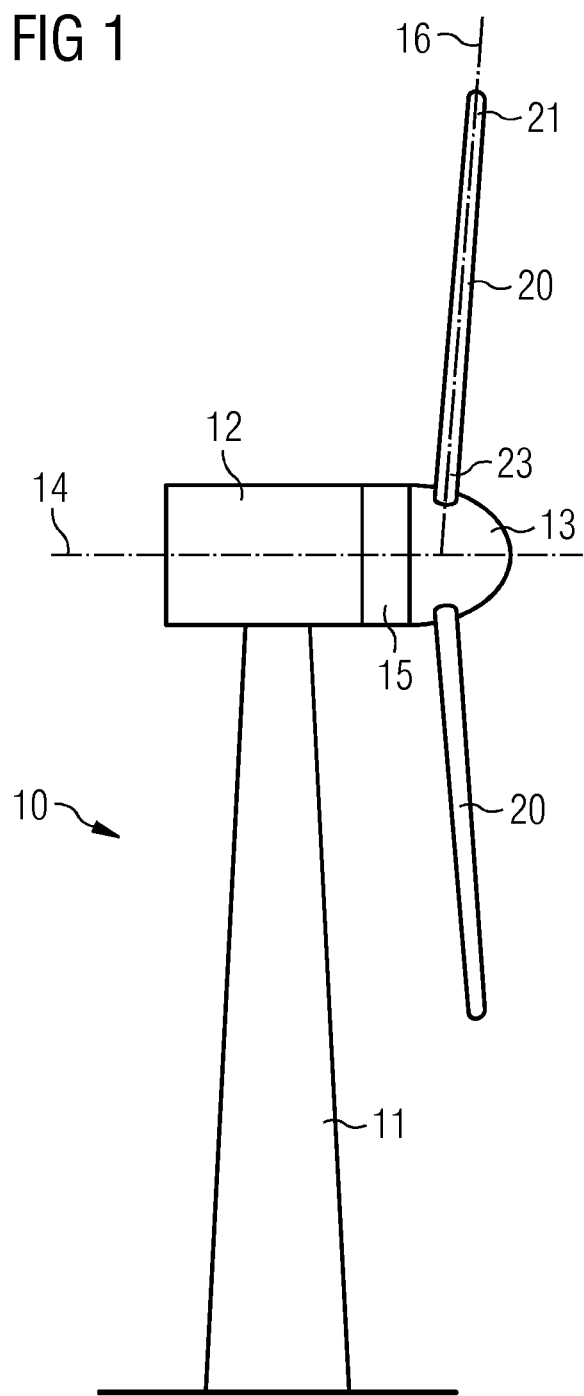
FIG. 1 shows a wind turbine.

The illustration in the drawings is in schematic form. It is noted that in different figures, similar or identical elements may be provided with the same reference signs.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also comprises a hub 13 with one or more rotor blades 20. Advantageously, the wind turbine 10 comprises three rotor blades 20. The hub 13 is mounted rotatable with regard to the nacelle 12 by means of a main bearing. The hub 13 is mounted rotatable about a rotor axis of rotation 14.

The wind turbine 10 furthermore comprises a main shaft, which connects the hub 13 with a rotor of a generator 15. If the hub 13 is connected directly to the rotor of the generator 15, the wind turbine is referred to as a gearless, direct drive wind turbine. Alternatively, the hub 13 may also be connected to the rotor of the generator 15 via a gearbox. This type of wind turbine is commonly referred to as a geared wind turbine.

The generator 15 is accommodated within the nacelle 12. It comprises the rotor and a stator. The generator 15 is arranged and prepared for converting the rotational energy from the rotor into electrical energy.

In the concrete example of FIG. 1, the wind turbine 10 comprises three rotor blades 20 (of which two rotor blades 20 are depicted in FIG. 1). The rotor blades 20 are mounted rotatable with regard to the hub 13 by means of a pitch bearing. The rotor blades 20 may thus be pitched about a pitch axis 16 in order to optimize the orientation with regard to the wind flow impinging on the wind turbine 10. Each of the rotor blades 20 comprises a root section 23 and a tip section 21. The root section 23 refers to the section of the rotor blade 20 which is closest to the hub 13. The tip section 21 refers to the section of the rotor blade 20 which is furthest away of the hub 13, thus being opposite to the root section 23.

Figure 2:
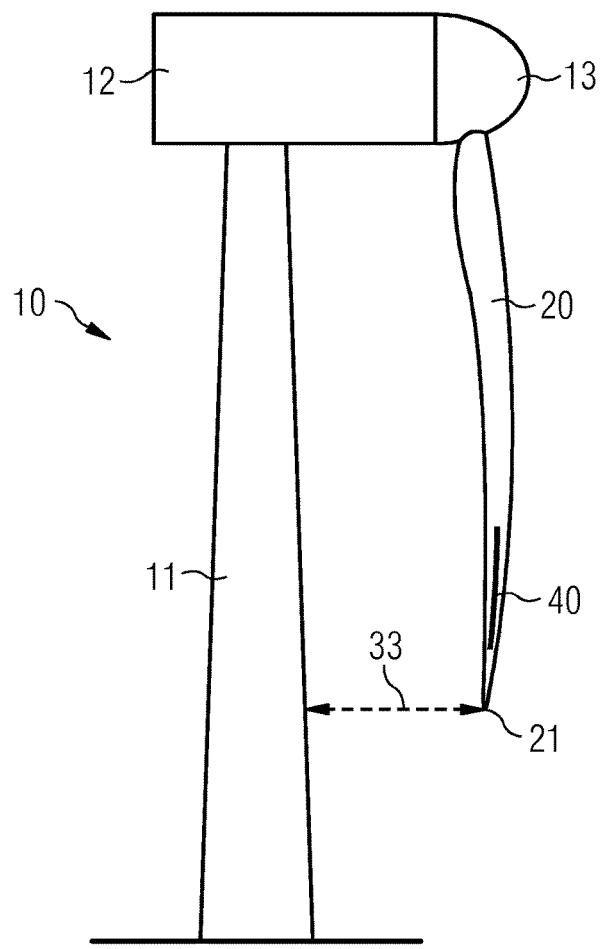
FIG. 2 shows a rotor blade of a wind turbine in an unloaded state.

FIG. 2 shows some selected components of a wind turbine. A tower 11, a nacelle 12 and a hub 13 is shown. The nacelle 12 is mounted on the top of the tower 11 and the hub 13 is mounted rotatable with regard to the nacelle 12. One rotor blade 20, which is mounted to the hub 13 is illustrated in FIG. 2. A clearance 33 between a tip section 21 of the rotor blade 20 and the surface of the tower 11 can be assigned to the wind turbine. In FIG. 2 the clearance 33 is relatively large which is due to the fact that the rotor blade 20 is relatively straight.

The rotor blade 20 in FIG. 2 refers to an unloaded state of the rotor blade 20. Note that the rotor blade 20 in FIG. 2 is drawn as a straight rotor blade 20. Alternatively, the rotor blade 20 may also be pre-bent away from the tower 11 at an unloaded state of the rotor blade 20. The rotor blade 20 comprises flow deflection devices 40 which are positioned close to the tip section 21. A plurality of flow deflection devices 40 are arranged adjacent to each other, resulting in a strip of flow deflection devices 40.

Figure 3:
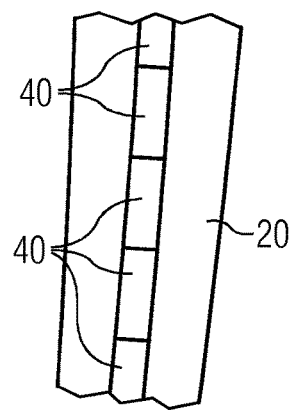
FIG. 3 shows a set of flow deflection devices on the unloaded rotor blade of FIG. 2.

FIG. 3 shows a detailed view of a part of the rotor blade 20 shown in FIG. 2. The strip of flow deflection devices 40 can be discerned. Furthermore it can be seen that the flow deflection devices 40 are closed. FIG. 3 shows a first configuration of the flow deflection devices 40.

Figure 4:
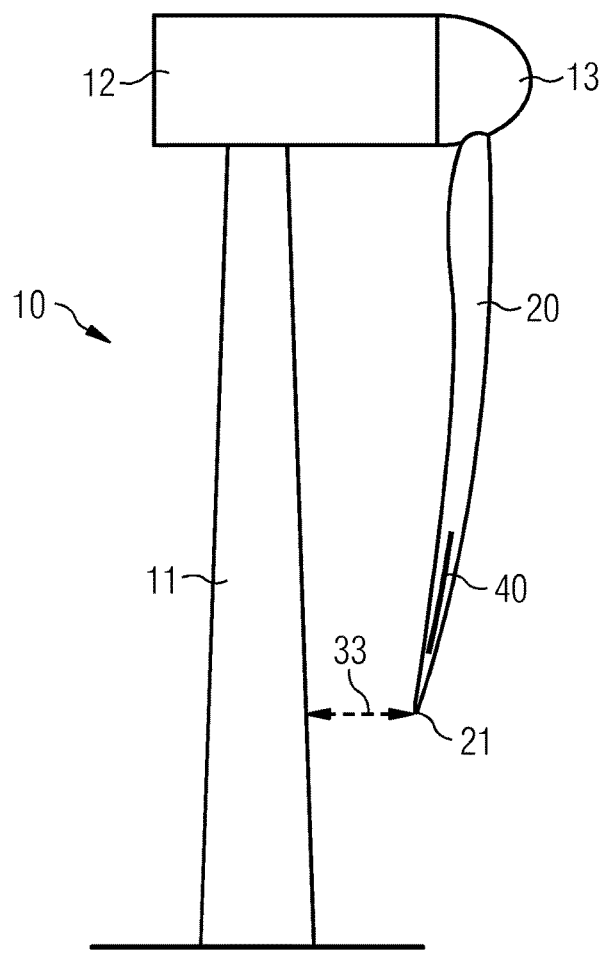
FIG. 4 shows the rotor blade of FIG. 2 in a loaded state.

FIG. 4 shows the same components of the wind turbine as in FIG. 2. However, in FIG. 4 the rotor blade 20 is shown in a state of considerable loading. As a consequence, the rotor blade 20 is bent along its longitudinal axis thus leading to a deflection of the tip section 21 towards the tower 11. As a consequence the clearance 33 between the tip section 21 and the surface of the tower 11 is reduced. If the rotor blade 20 is further bent towards the tower 11, there is the danger of a collision between the rotor blade 20 and the tower 11.

This could result in an undesired stand-still of the wind turbine and in structural damage of components of the wind turbine.

Figure 5:
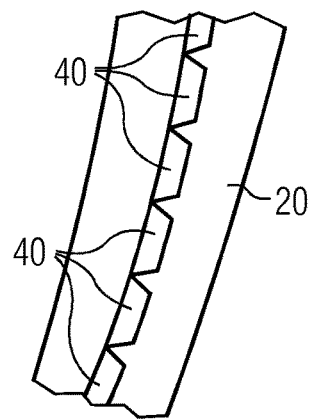
FIG. 5 shows the flow deflection devices of FIG. 3 in the loaded state of the rotor blade of FIG. 4.

FIG. 5 shows a second configuration of the flow deflection devices 40 which are arranged close to the tip section 21 of the rotor blade 20 as shown in FIG. 4. As a consequence of the changed configuration of the flow deflection devices 40, bending of the rotor blade 20 is reduced. This is due to the fact that the airflow is deflected and load on the rotor blade is decreased.

Figure 6A:
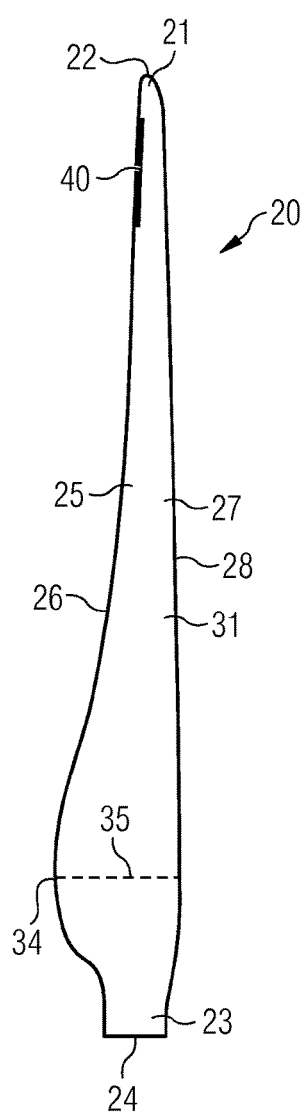
FIGS. 6a-6c show advantageous locations of the flow deflection device on a rotor blade.
Figure 6B:
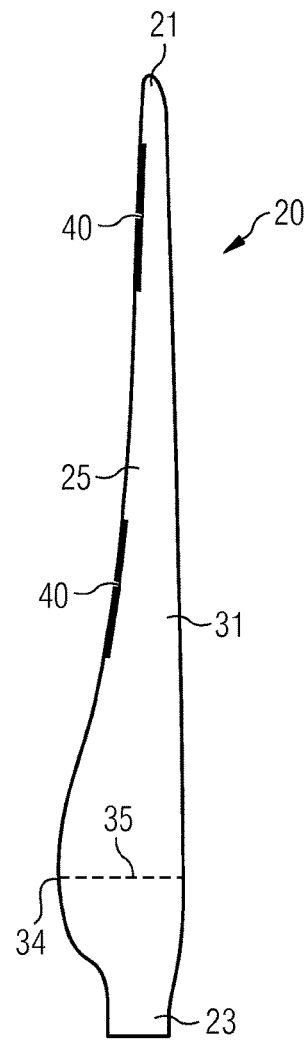
Figure 6C:
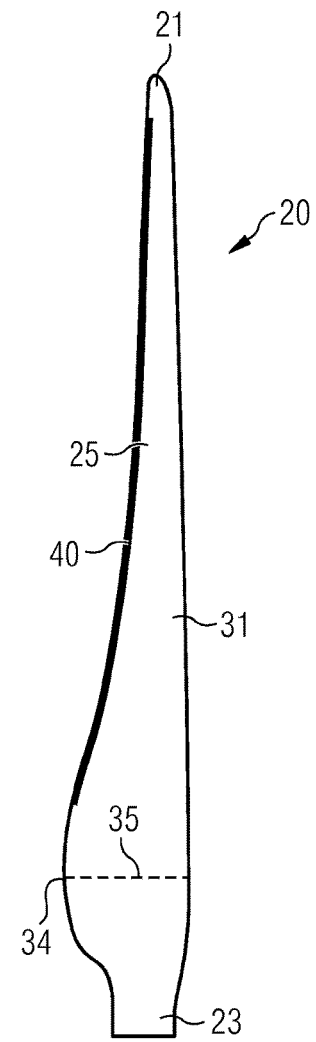

FIGS. 6a to 6c show a rotor blade 20 in a first embodiment of the invention. The rotor blade 20 comprises a root 24 which is surrounded by a root section 23. Opposite to the root section 23 is a tip section 21 which is surrounding the tip 22 of the rotor blade 20. The rotor blade 20 furthermore comprises a trailing edge 26, surrounded by a trailing edge section 25, and a leading edge 28, surrounded by a leading edge section 27. FIGS. 6a to 6c show a top view onto the pressure side 31 of the rotor blade 20.

A chord 35 can be attributed to each span-wise position of the rotor blade 20, wherein the chord is a straight line between the trailing edge 26 and the leading edge 28. The point of the rotor blade 20 where the chord 35, i.e. the length of the chord 35, is maximum is referred to as shoulder 34 of the rotor blade 20.

FIG. 6a shows a first placement of flow deflection devices 40. Here, the flow deflection devices 40 are placed close to the tip section 21.

In FIG. 6b two regions of the trailing edge section 25 are equipped with flow deflection devices 40. On the one hand a region of the trailing edge section 25 close to the tip section 21 is equipped with flow deflection devices 40; and on the other hand a section of the trailing edge section 25 which is approximately in the middle between the shoulder 34 and the tip section 21 is equipped with flow deflection devices 40.

FIG. 6c shows a third advantageous placement of flow deflection devices 40 on a rotor blade 20. In this embodiment, the trailing edge section 25 almost along its entire length from the shoulder 34 to the tip section 21 is equipped with flow deflection devices 40.

Figure 7:
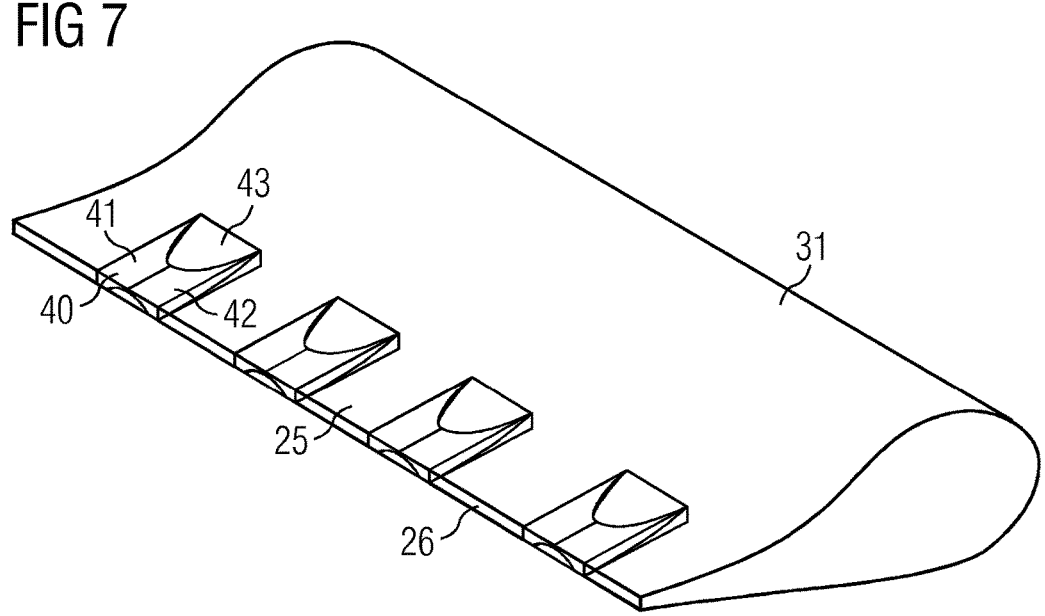
FIG. 7 shows a first embodiment of a flow deflection device.

FIG. 7 shows a first specific embodiment of a flow deflection device 40. The flow deflection device 40 comprises a first lid 41, a second lid 42 and a base plate 43. It can be seen that a plurality of flow deflection devices 40 are arranged one after the other with spaces or gaps in between each other along the trailing edge 26 in the trailing edge section 25. In FIG. 7 the flow deflection devices 40 are placed on the pressure side 31 of the rotor blade. FIG. 7 shows a configuration wherein the flow deflection devices comprise a closed flow channel due to closed lids 41, 42. This configuration relates to the scenario of an unloaded rotor blade with a small bending or no bending at all.

Figure 8:
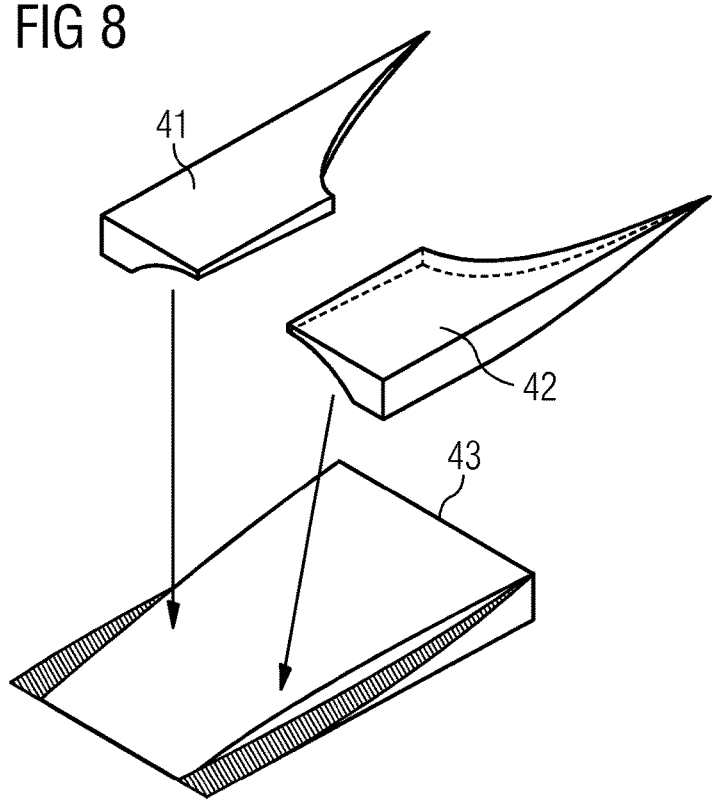
FIG. 8 shows a detailed view of the components of the flow deflection device shown in FIG. 7.

FIG. 8 shows a detailed view of the components of the flow deflection device 40. For sake of clarity the single components of the flow deflection device 40 are shown separate from each other. It can be seen that the first lid 41 and the second lid 42 are shaped such that they are flush with a base plate 43.

Figure 9A:
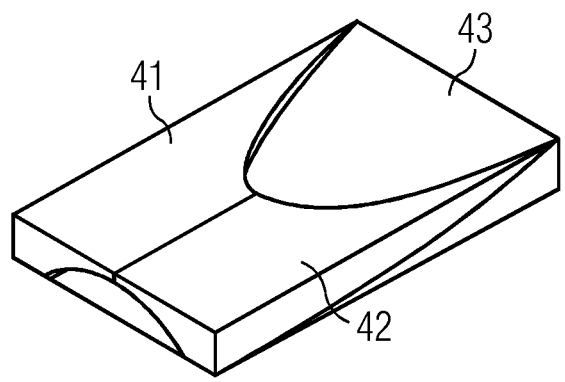
FIGS. 9a and 9b show the flow deflection device of the first embodiment in two different configurations.

In particular, a configuration where the two lids 41, 42 are flush with the base plate 43 refers to the scenario of a closed flow channel, see FIG. 9a.

Figure 9B:
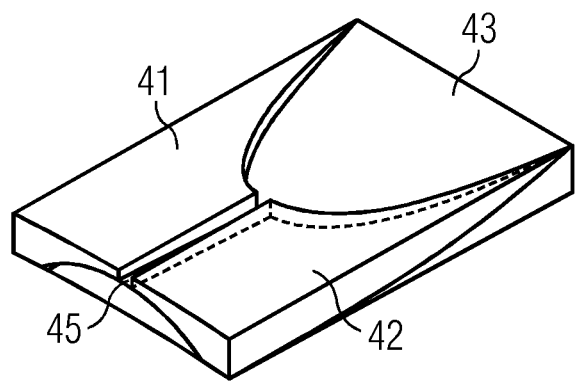

In contrast to this, a flow channel 45 is opened when the first lid 41 and the second lid 42 opens up as it is shown exemplarily in FIG. 9b.

Figure 10A:
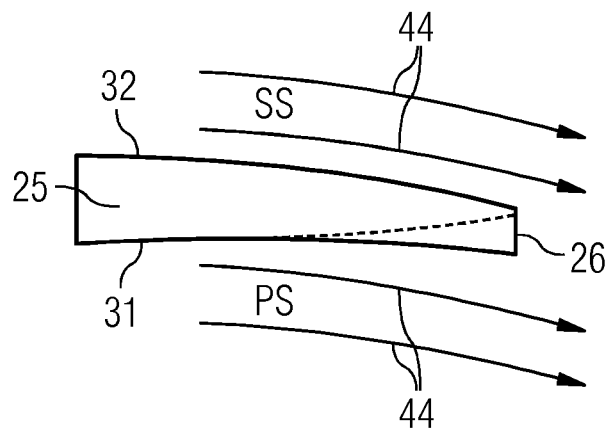
FIGS. 10a and 10b show the airflow flowing along the flow deflection device in a first configuration and a second configuration.
Figure 10B:
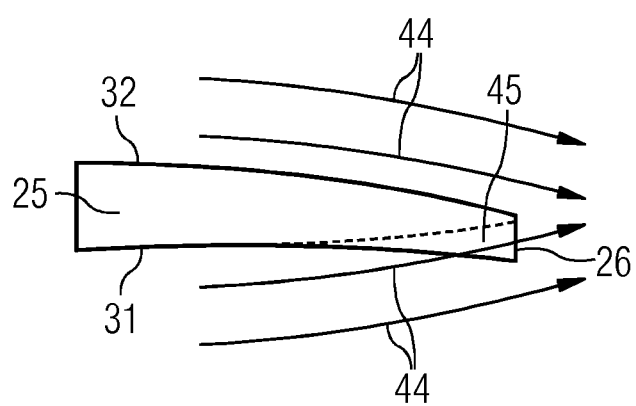

The impact of a closed or an open flow channel 45 can be seen in FIGS. 10a and 10b.

In FIG. 10a a trailing edge section 25 of a rotor blade of a wind turbine is shown comprising a flat back trailing edge 26. Airflow 44 is flowing along a suction side 32 and a pressure side 31 of the rotor blade. A flow deflection device 40 is integrated at the pressure side 31 close to the trailing edge 26. As a consequence, the airflow 44 along the suction side 32 is undisturbed, in other words un-deflected; however, the airflow 44 on the pressure side 31 changes with a changing configuration of the flow deflection device 40.

This means that by opening the flow channel 45 in the second configuration of the flow deflection device 40, as shown in FIG. 10b, the airflow 44 along the pressure side 31 is deflected towards the suction side 32. As a consequence load of the rotor blade is reduced.

Figure 11A:
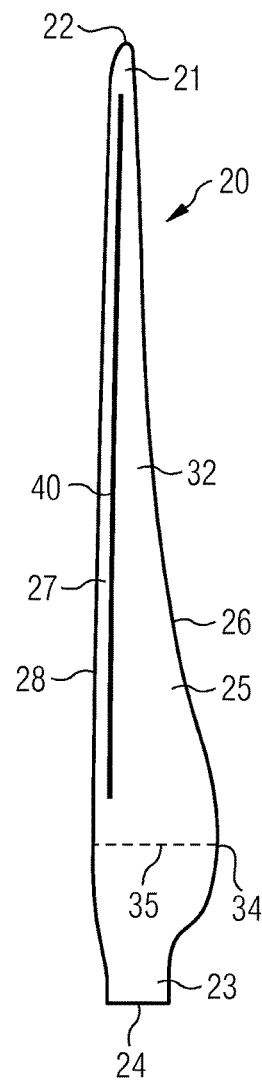
FIGS. 11a-11c show advantageous locations of a flow deflection device of a second embodiment.
Figure 11B:
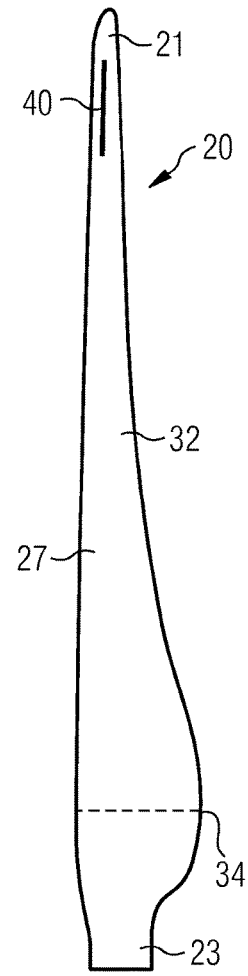
Figure 11C:
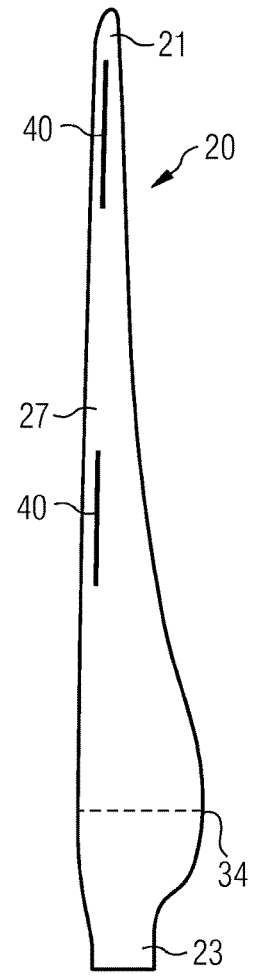

FIGS. 11a to 11c show a rotor blade 20 with flow deflection devices 40 in a second embodiment of the invention. The rotor blade 20 without the flow deflection devices 40 has a similar shape and design as shown in FIGS. 6a to 6c. However, in FIGS. 11a to 11c a top view on the suction side 32 of the rotor blade 20 is shown. The flow deflection devices 40 in this second embodiment of the invention are located on the suction side 32 of the rotor blade 20, relatively close to the leading edge 28. It can be seen from FIGS. 11a to 11c that the flow deflection devices 40 may either comprise the almost entire length of the leading edge 28 from the shoulder 34 to the tip section 21, or only cover a relatively small section close to the tip section 21, or may comprise several sections along the leading edge section 27. Obviously, other configurations and placements of the flow deflection devices 40 are possible, too.

Figure 12A:
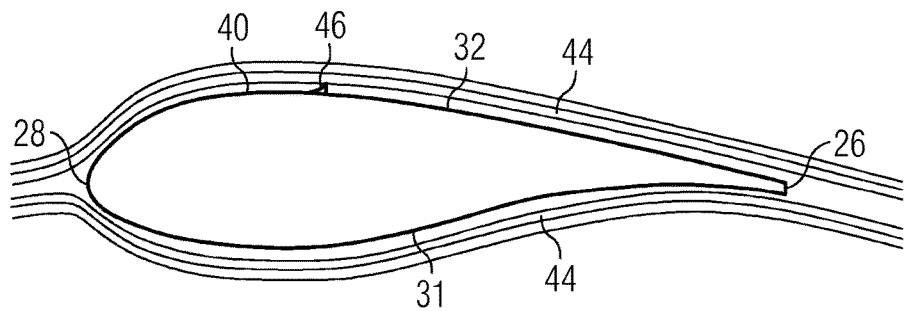
FIGS. 12a and 12b show the influence of a flow deflection device on the airflow flowing across the rotor blade.

FIG. 12a shows a flow deflection device 40 located at the suction side 32 of a rotor blade 20. The flow deflection device 40 is placed slightly upstream of a vortex generator 46, wherein upstream refers to an airflow 44 flowing from the leading edge 28 to the trailing edge 26. FIG. 12a represents an unloaded, unbent or slightly bent state of the rotor blade. The flow deflection device does not influence or deflect the airflow 44 thus the vortex generator 46 is located within the boundary layer of the airflow 44, which results in an optimum technical effect of the vortex generator 46 and a delayed stall of the airflow 44.

Figure 12B:
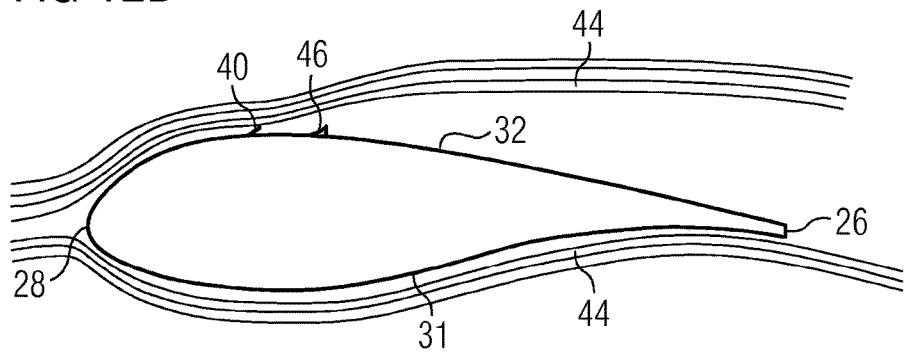

In FIG. 12b, however, the flow deflection device 40 is in a second configuration, resulting in folding up, in other words away from the surface of the rotor blade. This has the consequence that the airflow 44 is deflected away from the suction side 32 of the rotor blade. Thus, the vortex generator 46 is not within the boundary layer of the airflow 44 anymore, resulting in a premature stall of the airflow 44.

Figure 13A:
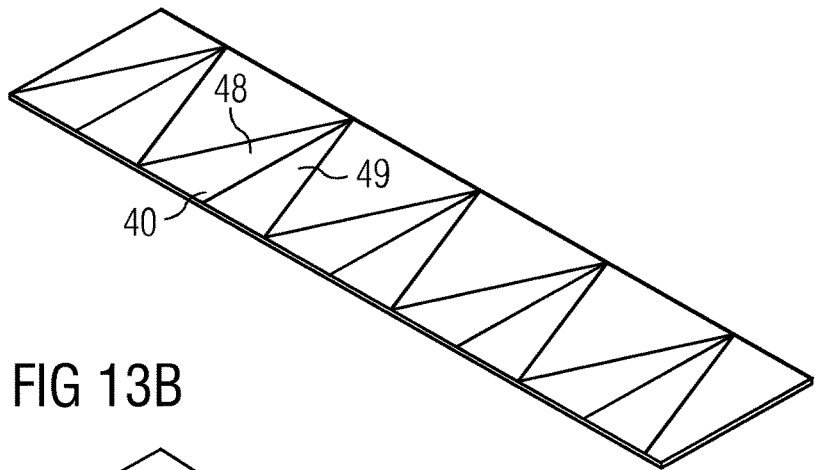
FIGS. 13a and 13b show a flow deflection device in a second embodiment.
Figure 13B:
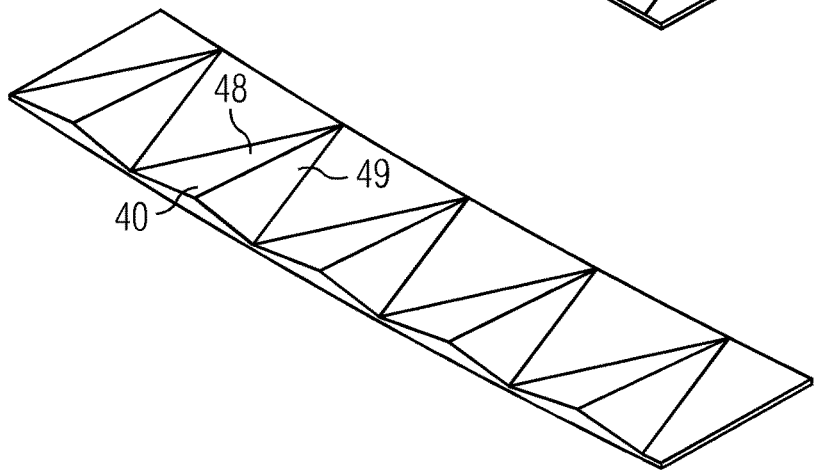

FIGS. 13a and 13b illustrate a second embodiment of the flow deflection device 40. FIG. 13a shows a first surface portion 48 and a second surface portion 49 of the flow deflection device 40. It can be seen that this results in a flat, first configuration of the flow deflection device 40.

In contrast, FIG. 13b shows that the flow deflection device 40 folds up, resulting in a folding up of the first surface portion 48 and a folding up of the second surface portion 49.

Figure 14:
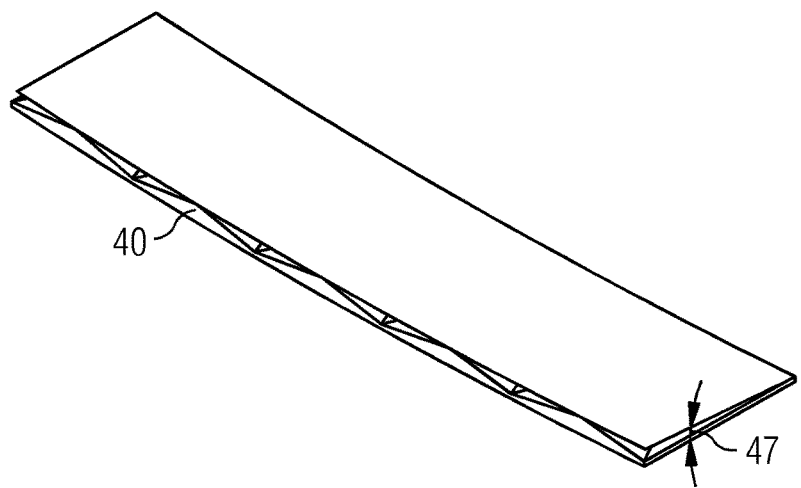
FIG. 14 shows the flow deflection device of FIG. 13b in another view.

This leads to a deflection angle 47, which can be seen in FIG. 14, which is greater than zero degrees. Note that in a rotor blade of a typical dimension exceeding 50 meters and going up until 100 meters, a folding up of the flow deflection device 40 of a few millimeters may be enough to significantly and substantially deflect the airflow and to have a significant impact on the load of the rotor blade.

The invention claimed is:

1. A rotor blade of a wind turbine, wherein the rotor blade comprises a flow deflection device for influencing an airflow flowing from a leading edge section of the rotor blade to a trailing edge section of the rotor blade,
wherein the flow deflection device passively changes its configuration depending on the bending of the rotor blade,
wherein the airflow is influenced such that load on the rotor blade is reduced,
wherein the flow deflection device comprises a base plate disposed atop and secured to a surface of the rotor blade, and a lid comprising a first surface portion and a second surface portion, the lid disposed atop and secured to the base plate, and
wherein the first surface portion and the second surface portion fold up when bending of the rotor blade is above a pre-determined threshold bending value, thereby forming a gap between the base plate and the first and the second surface portions, such that the first and the second surface portions form a ramp that guides the airflow away from the surface of the rotor blade.

2. The rotor blade according to claim 1,
wherein the flow deflection device is arranged on a suction side of the rotor blade.

3. The rotor blade according to claim 2,
wherein the flow deflection device is arranged upstream with regard to a vortex generator mounted to the surface of the rotor blade.

4. The rotor blade according to claim 2,
wherein the flow deflection device is a part of a retrofit kit for an existing rotor blade of a wind turbine.

5. The rotor blade according to claim 1,
wherein the flow deflection device continuously changes its configuration depending on the bending of the rotor blade.

6. A method to reduce load on a rotor blade of a wind turbine, wherein an airflow flowing from a leading edge section of the rotor blade to a trailing edge section of the rotor blade is passively influenced by a flow deflection device, the method comprising:
inducing a change of the configuration of the flow deflection device by bending of the rotor blade, and
influencing the airflow with the flow deflection device such that the load on the rotor blade is reduced,
wherein the flow deflection device comprises a base plate disposed atop and secured to a surface of the rotor blade, and a first surface portion and a second surface portion both disposed atop and secured to the base plate, and
wherein the first surface portion and the second surface portion fold up when bending of the rotor blade is above a pre-determined threshold bending value, thereby forming a gap between the base plate and the first and the second surface portions, such that the first and the second surface portions form a ramp that guides the airflow away from the surface of the rotor blade.

7. The method according to claim 6,
wherein the flow deflection device is retrofitted to the wind turbine.

8. The method according to claim 6,
wherein, the flow deflection device continuously changes its configuration depending on the bending of the rotor blade.

9. A rotor blade of a wind turbine, wherein the rotor blade comprises:
a flow deflecting device comprising a base plate disposed atop and secured to a surface of the rotor blade, and a lid disposed atop the base plate;

wherein during deflection of the rotor blade the lid translates relative to the base plate to an unstowed configuration;

wherein in the unstowed configuration airflow is redirected to reduce a load on the rotor blade; and wherein the lid comprises two panels, each panel individually secured to the base plate at a first end and not secured to the base plate at a second end, wherein the translation comprises the second ends moving relative to the base plate and apart from each other, thereby forming a flow channel therebetween into which the airflow is redirected.

10. A rotor blade of a wind turbine, wherein the rotor blade comprises:

a flow deflecting device comprising a base plate disposed atop and secured to a surface of the rotor blade, and a lid disposed atop the base plate;

wherein during deflection of the rotor blade the lid translates relative to the base plate to an unstowed configuration;

wherein in the unstowed configuration airflow is redirected to reduce a load on the rotor blade; and wherein the lid is secured to the base plate in two locations, wherein the two locations are separated by a region of the lid, wherein the translation comprises the region lifting off the base plate to form a ramp that redirects the airflow.

11. The rotor blade of claim 10, wherein the base plate conforms to a curvature of the surface of the rotor blade during the deflection.

* * * * *